United States Patent
Son

(10) Patent No.: US 7,304,707 B2
(45) Date of Patent: Dec. 4, 2007

(54) IN-PLANE SWITCHING MODE LIQUID CRYSTAL DISPLAY DEVICE AND METHOD FOR FABRICATING THE SAME

(75) Inventor: Hyeon Ho Son, Anyang-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 314 days.

(21) Appl. No.: 11/001,176

(22) Filed: Dec. 2, 2004

(65) Prior Publication Data
US 2005/0117103 A1 Jun. 2, 2005

(30) Foreign Application Priority Data
Dec. 2, 2003 (KR) .................. 10-2003-0086708

(51) Int. Cl.
*G02F 1/1343* (2006.01)
(52) U.S. Cl. .................................. 349/141
(58) Field of Classification Search .............. 349/141
See application file for complete search history.

(56) References Cited

U.S. PATENT DOCUMENTS

| 2002/0018166 A1 | 2/2002 | Matsumoto et al. |
| 2002/0118330 A1 | 8/2002 | Lee |
| 2002/0159016 A1* | 10/2002 | Nishida et al. ............. 349/141 |

FOREIGN PATENT DOCUMENTS

| CN | 1420386 A | 5/2003 |
| JP | 2003-066482 | 3/2003 |
| KR | 1020020069168 | 8/2002 |
| KR | 1020030058340 | 7/2003 |

OTHER PUBLICATIONS

Communication from Korean Patent Office dated Aug. 24, 2005.
Communication from Korean Patent Office dated Apr. 27, 2006.

* cited by examiner

*Primary Examiner*—James A. Dudek
(74) *Attorney, Agent, or Firm*—McKenna Long & Aldridge LLP

(57) ABSTRACT

An IPS mode LCD device and a method for fabricating the same is disclosed to improve an aperture ratio without an increase in resistance of a data line. The device includes a substrate; a plurality of gate lines formed on the substrate; a plurality of data lines formed substantially perpendicular to the gate lines to define pixel regions, each of the data lines having at least one extending part at both sides thereof; a common line formed substantially parallel to the gate lines; a common electrode perpendicularly extending from the common line; a thin film transistor formed at a crossing portion of the gate and data lines; and a pixel electrode connected to a drain electrode of the thin film transistor, and formed substantially parallel to the common electrode.

9 Claims, 10 Drawing Sheets

IN-PLANE SWITCHING MODE LIQUID CRYSTAL DISPLAY DEVICE AND METHOD FOR FABRICATING THE SAME

This application claims the benefit of the Korean Application No. P2003-86708, filed on Dec. 2, 2003, which is hereby incorporated by reference for all purposes as if fully set forth herein.

BACKGROUND OF THE INVENTION

1. Field of the Invention

The present invention relates to a liquid crystal display (LCD) device, and more particularly, to an In-Plane Switching (IPS) mode liquid crystal display (LCD) device and a method for fabricating the same.

2. Discussion of the Related Art

A liquid crystal display (LCD) device is one type of flat display wherein the LCD device changes optical anisotropy by applying an electric field to liquid crystal having both the fluidity of liquid and the optical characteristics of crystal. Recently, the LCD device has been widely used because of its advantageous characteristics such as low power consumption, thin profile, high resolution, and suitableness for a large size, as compared with a related art cathode ray tube (CRT).

The LCD device has various modes based on the properties of liquid crystal used in the device and pattern structure. Specifically, the LCD device may be categorized as a Twisted Nematic (TN) mode for controlling liquid crystal direction by applying a voltage after arrangement of liquid crystal director twisted at 90°, a multi-domain mode for obtaining a wide viewing angle by dividing one pixel into several domains, an Optically Compensated Birefringence (OCB) mode for compensating a phase change of light according to a progressing direction of light by forming a compensation film on an outer surface of a substrate, an In-Plane Switching (IPS) mode for forming an electric field parallel to two substrates by forming two electrodes on any one substrate, and a Vertical Alignment (VA) mode for arranging a longitudinal (major) axis of liquid crystal molecule vertical to a plane of an alignment layer by using negative type liquid crystal and vertical alignment layer.

Among the types of LCD devices, the IPS mode LCD device generally includes a color filter substrate and a thin film transistor array substrate facing each other, and a liquid crystal layer formed between the two substrates. The color filter substrate includes a black matrix layer for preventing light leakage, and an R/G/B color filter layer for realizing various colors on the black matrix layer. The thin film transistor array substrate includes gate and data lines to define a pixel region, a switching device formed at a crossing point of the gate and data lines, and common and pixel electrodes alternately formed to generate an electric field parallel to the two substrates.

Hereinafter, a related art IPS mode LCD device and a method for fabricating the same will be described with reference to the accompanying drawings FIG. 1-5.

In FIG. 1, a thin film transistor array substrate includes a gate line 12, a data line 15, a thin film transistor TFT, a common line 25, a plurality of common electrodes 24, a plurality of pixel electrodes 17, and a capacitor electrode 26. At this time, the gate line 12 is formed at one direction on the thin film transistor array substrate, and the data line 15 is formed perpendicular to the gate line 12 to define a pixel region. Also, the thin film transistor TFT is formed at a crossing portion of the gate and data lines 12 and 15. Then, the common line 25 is formed in parallel to the gate line 12 within the pixel region. The plurality of common electrodes 24 extending from the common line 25 are formed in parallel to the data line 15. Also, the plurality of pixel electrodes 17 are connected to the thin film transistor TFT, and each pixel electrode 17 is provided in parallel between the common electrodes 24. The capacitor electrode 26 extended from the pixel electrode 17 is overlapped with the common line 25.

In addition, the thin film transistor TFT is comprised of a gate electrode 12a extending from the gate line 12, a gate insulating layer (not shown) formed on an entire surface of the thin film transistor array substrate including the gate electrode 12a, a semiconductor layer formed on the gate insulating layer above the gate electrode, and source and drain electrodes 15a and 15b, respectively, extending from the data line 15, and formed at both sides of the semiconductor layer 14.

At this time, the common line 25 is formed as one with the common electrode 24, and the gate line 12 is formed as one with the gate electrode.

The common line and the gate line are formed of a low-resistance metal material, at the same time. Also, any one of the common electrodes is overlapped with the data line, whereby it functions as a black matrix layer to improve an aperture ratio.

The pixel electrodes 17, extending from the common line 25 are formed of a transparent conductive metal material having great transmittance, for example, indium-tin-oxide (ITO), wherein each pixel electrode 17 alternates with the common electrode 24. Also, the pixel electrode 17 is in contact with the drain electrode of the thin film transistor TFT, whereby the pixel electrode 17 receives a voltage.

Also, on the common line 25, there is the capacitor electrode 26 formed as one with the pixel electrode 17, thereby forming a storage capacitor.

In the related art IPS mode LCD device, as shown in FIG. 2, if 5V is applied to the common electrode 24, and 0V is applied to the pixel electrode 17, an equipotential surface is formed in parallel to the electrodes at the portions right on the electrodes, and the equipotential surface is formed perpendicular to the electrodes at the portion between the two electrodes. Thus, since an electric field is perpendicular to the equipotential surface, a horizontal electric field is formed between the common electrode 24 and the pixel electrode 17, a vertical electric field is formed on the respective electrodes, and both the horizontal and vertical electric fields are formed in the edge of the electrode.

An alignment of liquid crystal molecules in the related art IPS mode LCD device is controlled with the electric field. For example, as shown in FIG. 3A, if a sufficient voltage is applied to liquid crystal molecules 31 initially aligned at the same direction as a transmission axis of one polarizing sheet, long axes of the liquid crystal molecules 31 are aligned in parallel to the electric field. In case the dielectric anisotropy of the liquid crystal is negative, short axes of the liquid crystal molecules are aligned in parallel to the electric field.

More specifically, first and second polarizing sheets are formed on outer surfaces of the thin film transistor array substrate and the color filter substrate bonded to each other, wherein the transmission axes of the first and second polarizing sheets are perpendicular to each other. Also, an alignment layer formed on the lower substrate is rubbed in parallel to the transmission axis of one polarizing sheet, whereby it is displayed on a normally black mode.

That is, if the voltage is not provided to the device, as shown in FIG. 3A, the liquid crystal molecules 31 are aligned to display the black state. Meanwhile, as shown in FIG. 3B, if the voltage is provided to the device, the liquid crystal molecules 31 are aligned in parallel to the electric field, thereby displaying the white state.

Meanwhile, as show in FIG. 1, the common electrode 24 and the pixel electrode 17 be formed in an alternating pattern in a straight line, or, as shown in FIG. 4, a common electrode 124 and a pixel electrode 117 may be formed in a zigzag pattern.

As shown in FIG. 4, in a case in which the common electrode 124 and the pixel electrode 117 are formed in a zigzag pattern, liquid crystal molecules are aligned in two directions, thereby forming a two-domain IPS structure. The two-domain structure achieves a wide viewing angle, as compared with the mono-domain IPS structure. The two-domain IPS structure is referred to as an S-IPS (Super-IPS) structure.

At this time, a data line 115 may be formed in a straight line, or may be formed in parallel with the common electrode 124 and the pixel electrode 117. However, in a case in which the data line is formed in a straight line, the device has a relatively low aperture ratio, as compared with the mono-domain IPS structure. That is, as shown in FIG. 4, the common electrode 124 is formed below the data line 115, and is formed in the zigzag pattern to be parallel with the pixel electrode 117, thereby deteriorating the aperture ratio.

To overcome this problem, a data line 215 may be directly bent as shown in FIG. 5, for improvement of the aperture ratio. In this case, another problem occurs of the increase of resistance because the length of the data line increases.

In detail, as shown in FIG. 5, the data line 215 is formed perpendicular to a gate line 212 to define a unit pixel region. At this time, the data line 215 is formed in the zigzag pattern to be parallel with a common electrode 224 and a pixel electrode 217. Thus, it is not required to from the common electrode 224 in parallel with the pixel electrode 217 below the data line 215, so that a light-shielding area is changed to an open area, thereby improving the aperture ratio.

However, as described above, in case the data line 215 is formed in the zigzag type, the total length of the data line increases, thereby increasing the line resistance.

SUMMARY OF THE INVENTION

Accordingly, the present invention is directed to an In-Plane Switching (IPS) mode liquid crystal display (LCD) device and a method for fabricating the same that substantially obviates one or more problems due to limitations and disadvantages of the related art.

An advantage of the present invention is to provide an IPS mode LCD device and a method for fabricating the same to improve an aperture ratio without increasing the resistance of a data line by forming the data line in a linear type having a plurality of extending parts.

Additional advantages and features of the invention will be set forth in the description which follows and in part will become apparent from the descriptions or may be learned from practice of the invention. The advantages of the invention may be realized and attained by the structure particularly pointed out in the written description and claims hereof as well as the appended drawings.

To achieve and other advantages and in accordance with the purpose of the invention, as embodied and broadly described herein, an IPS mode LCD device includes a substrate; a plurality of gate lines formed on the substrate; a plurality of data lines formed substantially perpendicular to the gate lines to define pixel regions, each of the data lines having at least one extending part at both sides thereof; a common line formed substantially parallel to the gate lines; a common electrode perpendicularly extending from the common line; a thin film transistor formed at a crossing portion of the gate and data lines; and a pixel electrode connected to a drain electrode of the thin film transistor, and formed substantially parallel to the common electrode.

In another aspect of the present invention, an IPS mode LCD device includes a substrate; a plurality of gate lines formed on the substrate, each of the gate lines having at least one extending part at both sides thereof; a common line formed substantially parallel to the gate lines; at least one common electrode extending from the common line, and formed substantially parallel to the gate lines; a plurality of data lines crossing the gate lines to define pixel regions; a thin film transistor formed at a crossing portion of the gate and data lines; and at least one pixel electrode formed substantially parallel to at least one common electrode.

In another aspect of the present invention, a method for fabricating an IPS mode LCD device includes forming a plurality of gate lines on a substrate; forming a common line substantially parallel to the gate lines, wherein at least one common electrode is formed to perpendicularly extend from the common line; forming a plurality of data lines crossing the gate lines to define pixel regions, each data line having at least one extending part at both sides thereof; forming a thin film transistor at a crossing portion of the gate and data lines; and forming at least one pixel electrode connected to a drain electrode of the thin film transistor, and substantially parallel to the at least one common electrode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Hereinafter, an IPS mode LCD device according to the present invention and a method for fabricating the same will be described with reference to the accompanying drawings. Especially, a thin film transistor array substrate of an IPS mode LCD device will be described as follows.

Hereinafter, an IPS mode LCD device according to the first embodiment of the present invention will be described with reference to FIG. 6 and FIG. 7.

Figure 1:
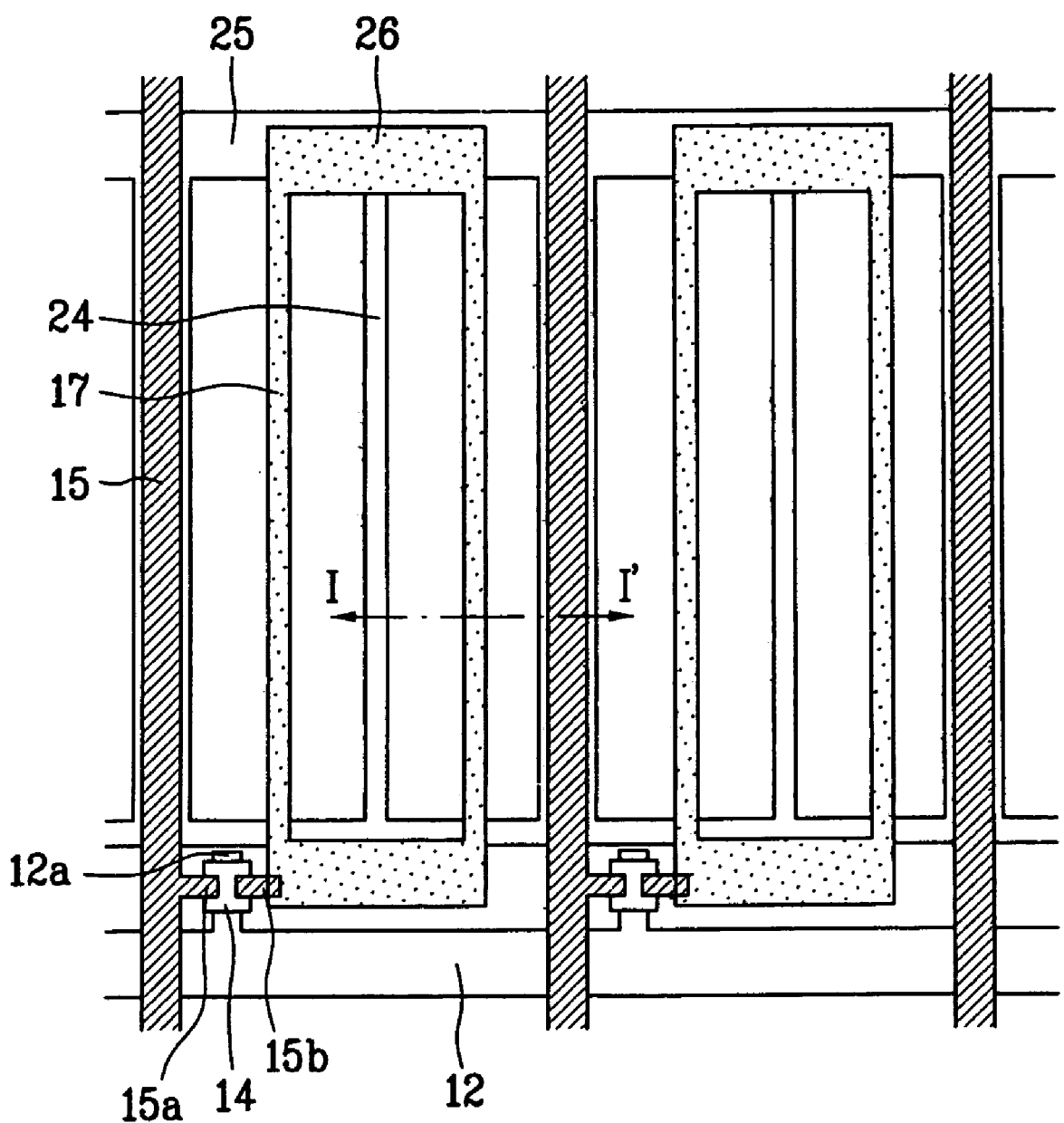
FIG. 1 is a plan view of a mono-domain IPS structure according to the related art.
Figure 2:
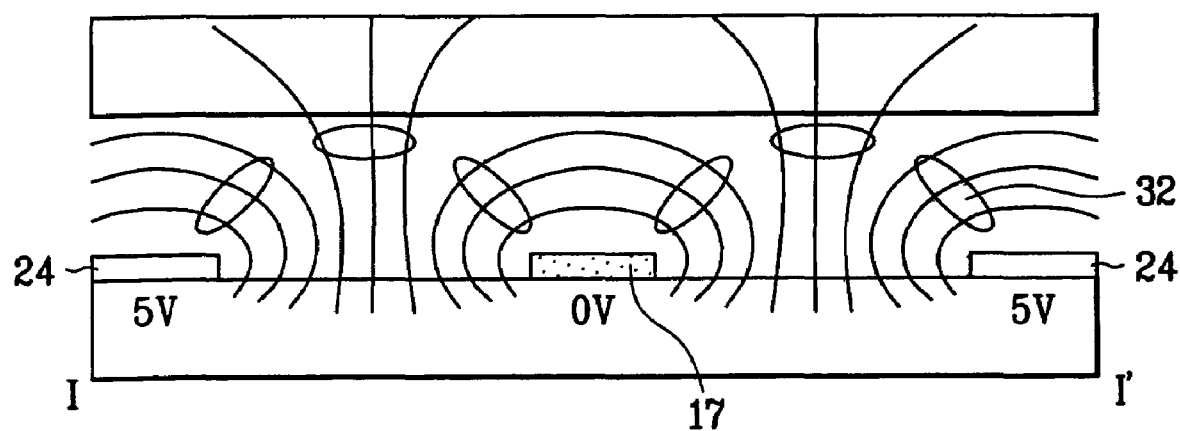
FIG. 2 is a voltage distribution of an IPS mode LCD device along I-I' of FIG. 1.
Figure 3A:
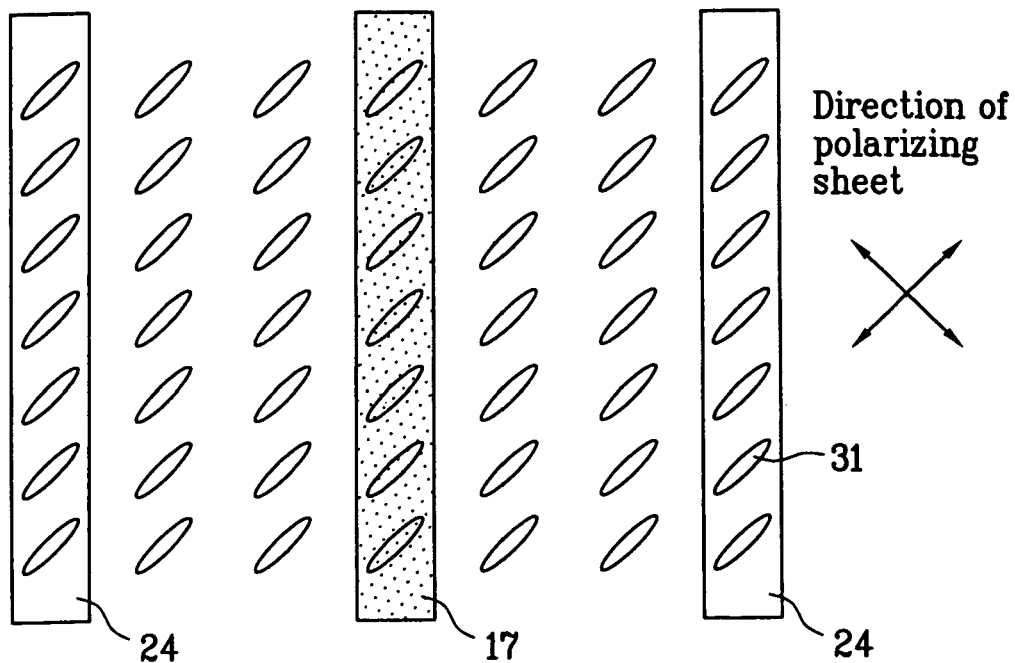
FIG. 3A and FIG. 3B are plan views of an IPS mode LCD device when a voltage is turned on/off.
Figure 3B:
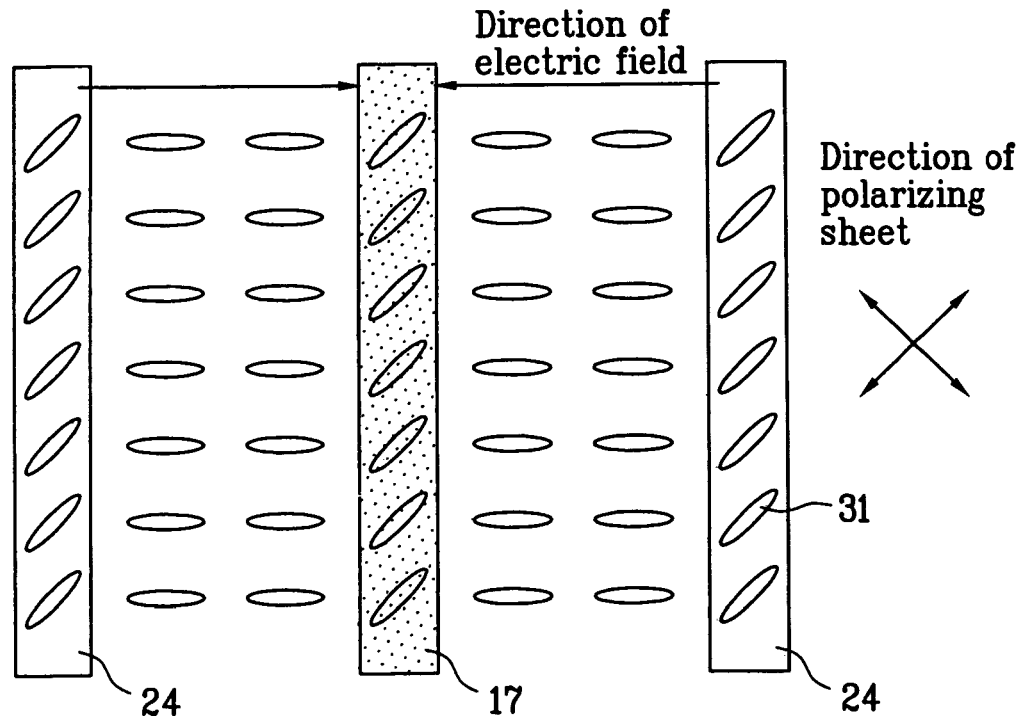
Figure 4:
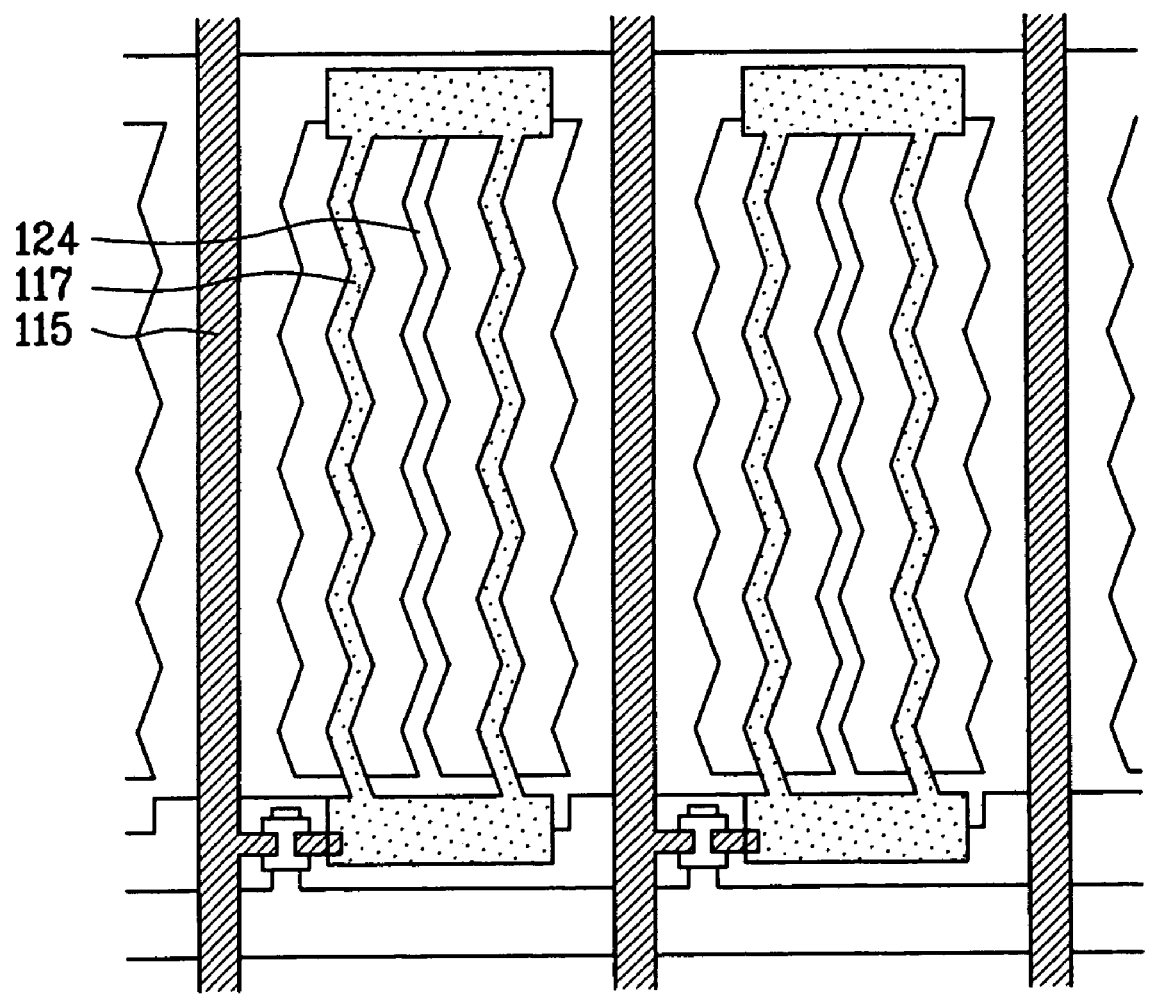
FIG. 4 is a plan view of a two-domain IPS mode LCD device according to one method of the related art.
Figure 5:
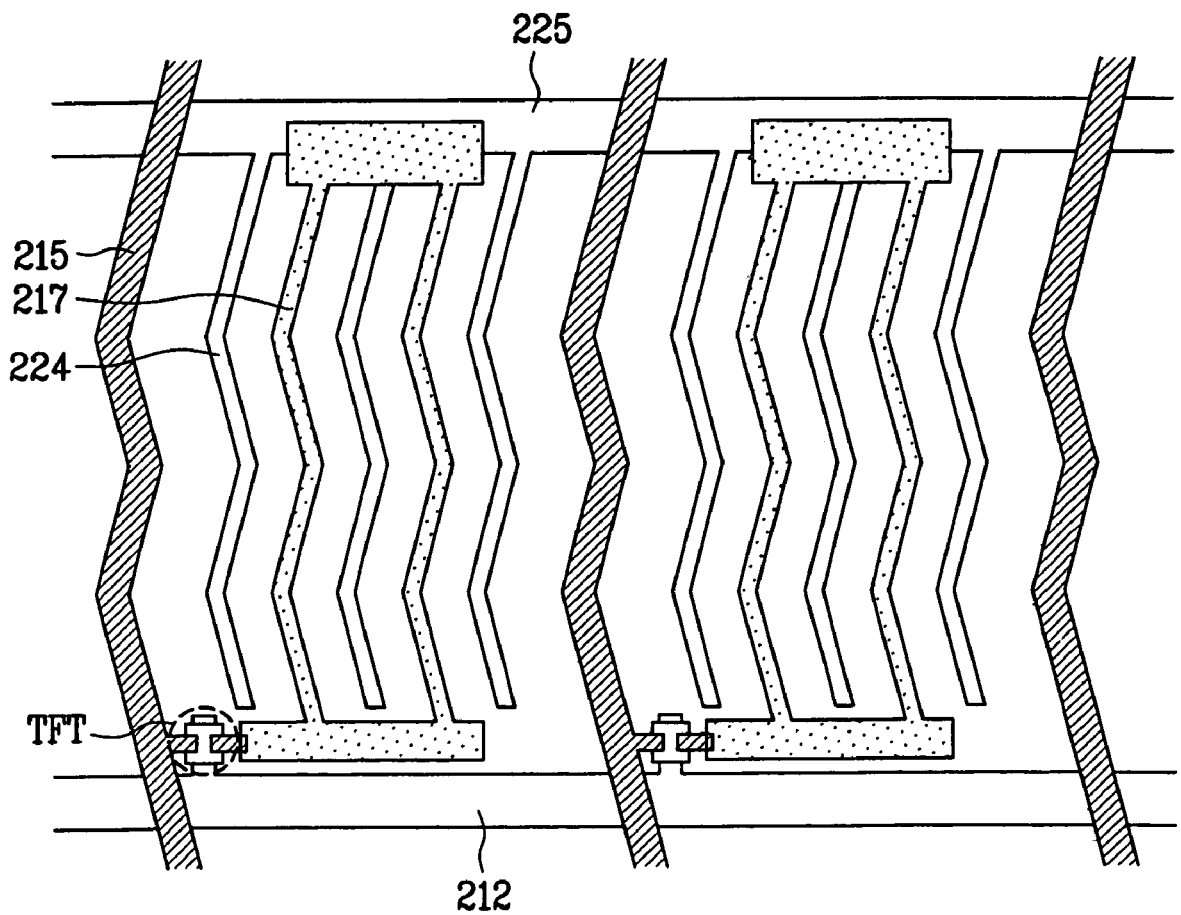
FIG. 5 is a plan view of a two-domain IPS mode LCD device according to another method of the related art.
Figure 6:
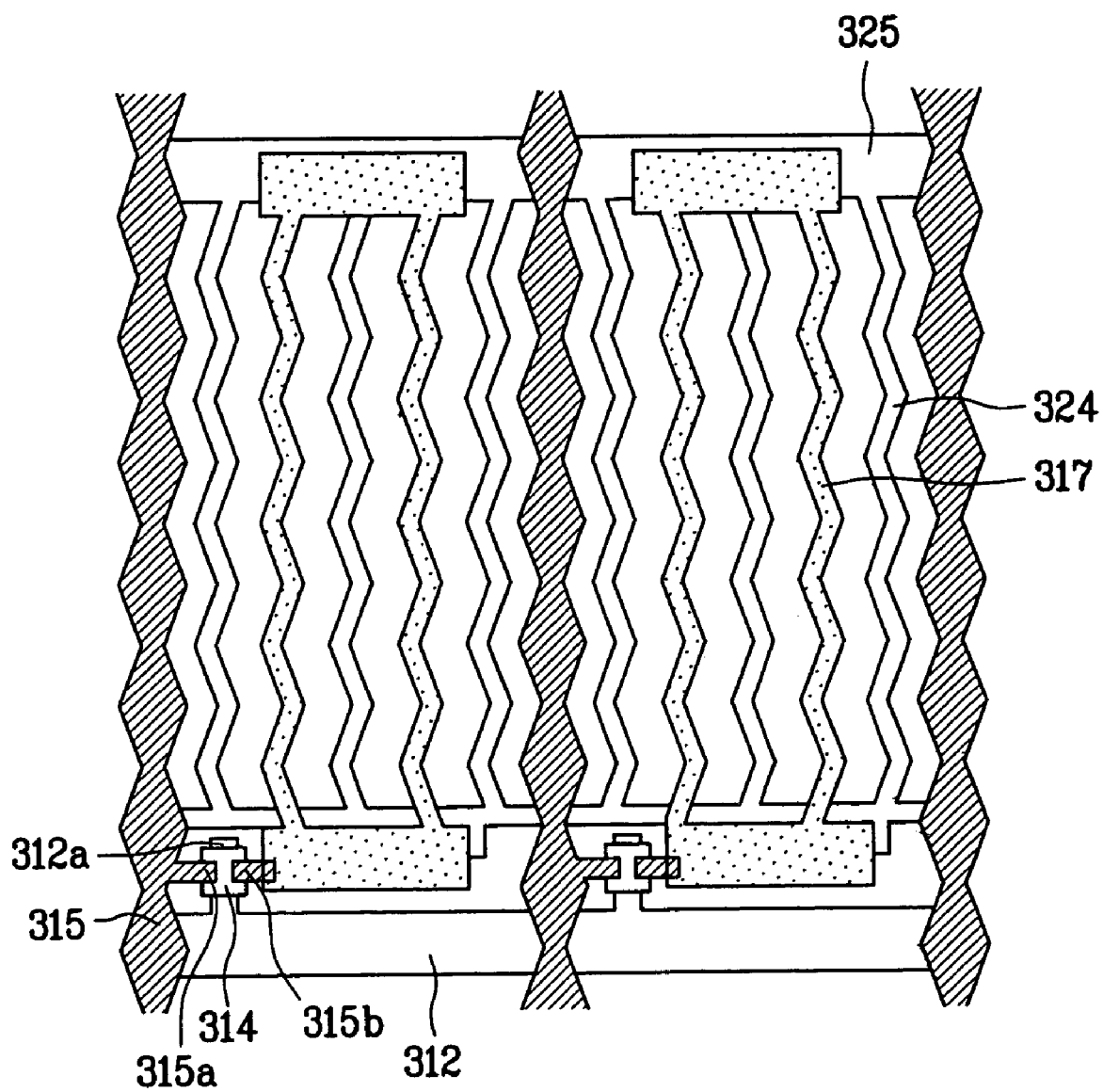
FIG. 6 is a plan view of an IPS mode LCD device according to the first embodiment of the present invention.

As shown in FIG. 6, an IPS mode LCD device according to the first embodiment of the present invention includes a plurality of gate lines 312, a plurality of data lines 315, a thin film transistor TFT, a common line 325, a plurality of common electrodes 324, and a plurality of pixel electrodes 317. The plurality of gate lines 312 are formed in one direction, and the plurality of data lines 315 are formed substantially perpendicular to the gate lines 312, thereby defining pixel regions. The thin film transistor TFT is formed in a predetermined portion of a unit pixel region defined by the gate and data lines 312 and 315, whereby the thin film transistor TFT switches a voltage. Also, the common line 325 is formed substantially in parallel with the gate line 312, to receive a common electrode signal from the outside of an active region. Then, the plurality of common electrodes 324 extending from the common line 325 are formed in a zigzag pattern. The plurality of pixel electrodes 317 are connected to the thin film transistor TFT, and are substantially parallel to the common electrodes 324 in the zigzag pattern.

Figure 7:
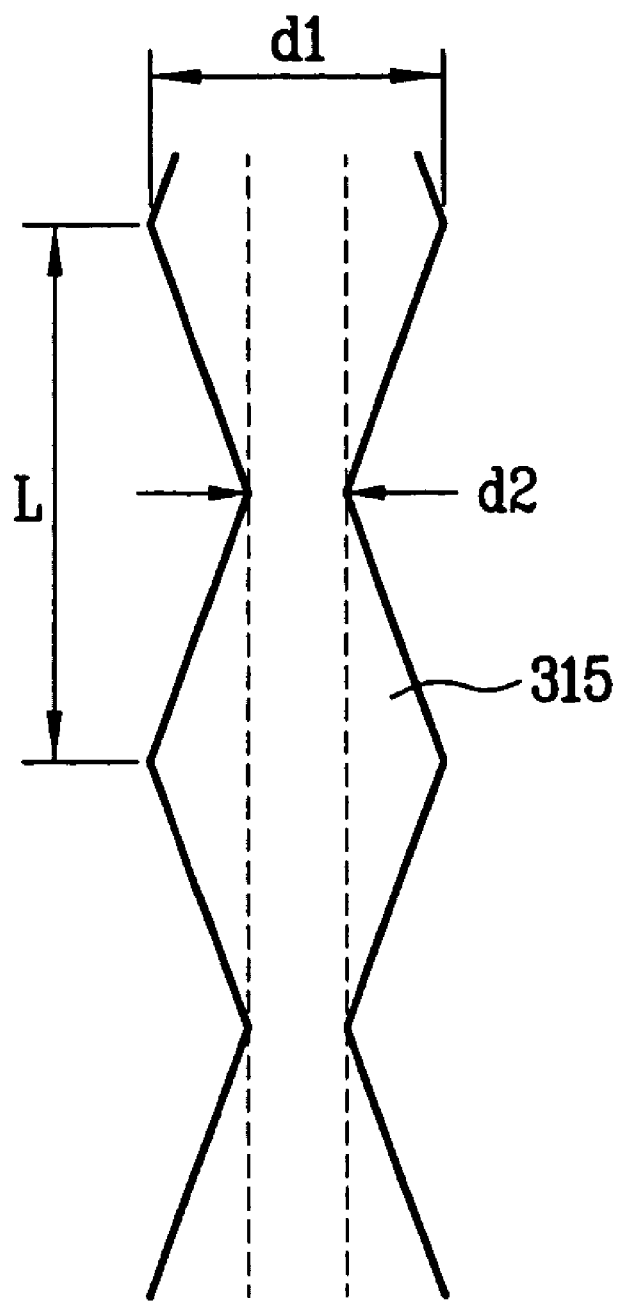
FIG. 7 is an expanded view of a data line of FIG. 6.

As shown in FIG. 7, the data line 315 is comprised of a linear portion having a constant width d2, and a plurality of triangular extending parts formed at both sides of the linear portion, wherein the extending parts are symmetrically formed with respect to both sides of the linear portion.

The thin film transistor TFT includes a gate electrode extending from the gate line 312, a semiconductor layer 314 formed on the gate electrode 312a, and source/drain electrodes 315a/315b extending from the data line 315 and formed in the edge of the semiconductor layer 314.

The gate line 312 and the data line 315 may be formed of a low-resistance metal material such as copper Cu, aluminum Al, aluminum neodymium AlNd, molybdenum Mo, chrome Cr, titanium Ti, tantalum Ta, or molybdenum-tungsten MoW.

The data line 315 is not formed in a shape of merely a linear type or a bent type of the related art, but in a shape of a linear portion having a plurality of extending parts. In this state, the extending parts of the data line 315 are substantially parallel with the common electrode 324 and the pixel electrode 317. That is, as shown in FIG. 6, each side of the data line 315 having the extending parts is substantially parallel with an adjacent common electrode 324 and adjacent pixel electrode 317.

As shown in FIG. 7, the extending parts of the data line 315 are symmetric with respect to a longitudinal direction of the linear portion of the data line 315. Also, a resistance value of the data line 315 is proportional to $L/\{(d1+d2)/2\}$ wherein L is a length between the highest points of adjacent extending parts, d1 is a width between the highest points of the symmetric extending parts, and d2 is a width of the linear part.

Meanwhile, in a straight data line of a mono-domain IPS structure according to the related art, on the assumption that the straight data line has a length of L and a width of d, a resistance value is proportional to $L/d$.

Accordingly, d1 and d2 of the data line may be set to a suitable range having similar resistance values $L/\{(d1+d2)/2\}$ of the data line according to the present invention and $L/d$ of the data line according to the related art. Herein, d2 is set to be 0 μm. In this case, the data lines of the related art and the present invention may be formed of the same material, because the resistance value is proportional to the length of the line, inversely proportional to the width of the line and proportional to a dielectric constant of the line material.

According to the first embodiment of the present invention, it is possible to form a two-domain IPS mode S-IPS structure without an increase of the resistance in the data line as compared with the related art mono-domain IPS mode.

In FIG. 6, the common electrode 324 and the pixel electrode 317 are formed in the zigzag pattern substantially parallel to each other, and each side of the data line 315 having the extending parts substantially parallel with the adjacent common electrode 324 and the adjacent pixel electrode 317. Thus, if each of the common electrode and the pixel electrode is bent several times in the unit pixel region, the data line is also bent several times in the unit pixel region. Meanwhile, if each of the common electrode and the pixel electrode is bent once in the center of the unit pixel region, the data line is also bent once in the center of the unit pixel region.

The pixel electrode 317 may be formed of a transparent conductive metal material having a high transmittance, for example, indium-tin-oxide ITO or indium-zinc-oxide IZO, as well as the low-resistance metal material.

The common line 325 and the common electrode 324 may be formed on the same layer as the gate line 312, or may be formed with the gate line 312 at the same time in a state not to be shorted with the pixel electrode 317. If the common line 325 and the common electrode 324 may be formed on the same layer as the pixel electrode 317, the common line 325 and the common electrode 324 may be formed of a transparent conductive layer of ITO or IZO, whereby it is referred to as an ITO-ITO electrode structure.

The common electrodes 324 may be connected with the common line 325, so that the common electrodes 324 receive a voltage from the common line 325. Also, ends of respective pixel electrodes 317 are connected with one another by one line substantially parallel with the gate line 312, and also are connected with the drain electrode 315b of the thin film transistor TFT to receive a voltage. Other ends of the pixel electrodes 317 are overlapped with the common line 325, and are connected with one another by one line overlapped with the common line 325, whereby the overlapped lines comprises a storage capacitor.

Meanwhile, although not shown, an inorganic insulating layer of silicon nitride SiNx or silicon oxide SiOx is deposited on an entire surface of the substrate including the gate line 312 and the common electrode 324 by Plasma Enhanced Chemical Vapor Deposition (PECVD), thereby forming a gate insulating layer. The gate insulating layer insulates the gate line 312 from the data line 315.

Furthermore, an inorganic insulating layer of silicon nitride SiNx or silicon oxide SiOx or an organic insulating layer of benzocyclobutene BCB or acrylic material may be coated on the entire surface of the substrate including the data line 315, thereby forming a passivation layer.

Generally, the passivation layer may be formed in a single-layered structure or a dual-layered structure of an inorganic insulating material and an organic insulating material. The inorganic insulating material has the great adhesive characteristics to the semiconductor layer, and the organic insulating material having a low dielectric constant decreases a parasitic capacitance.

Accordingly, in case of using the organic insulating material, even though the common electrode 324 and the pixel electrode 317 are overlapped with lower layers such as gate and data line layers, the parasitic capacitance is not generated, whereby the common electrode 324 and the pixel electrode 317 may be formed on the gate and data line layers, at the same time.

In this case, the common electrode 324 and the pixel electrode 317 are formed of the transparent conductive metal material having high transmittance, such as indium-tin-oxide ITO, which is referred to as the ITO-ITO electrode structure.

Hereinafter, an IPS mode LCD device according to the second embodiment of the present invention will be described with reference to FIG. 8 and FIG. 9. A data electrode structure of an IPS mode LCD device according to the second embodiment of the present invention is different from a data electrode structure of the IPS mode LCD device according to the first embodiment of the present invention.

Figure 8:
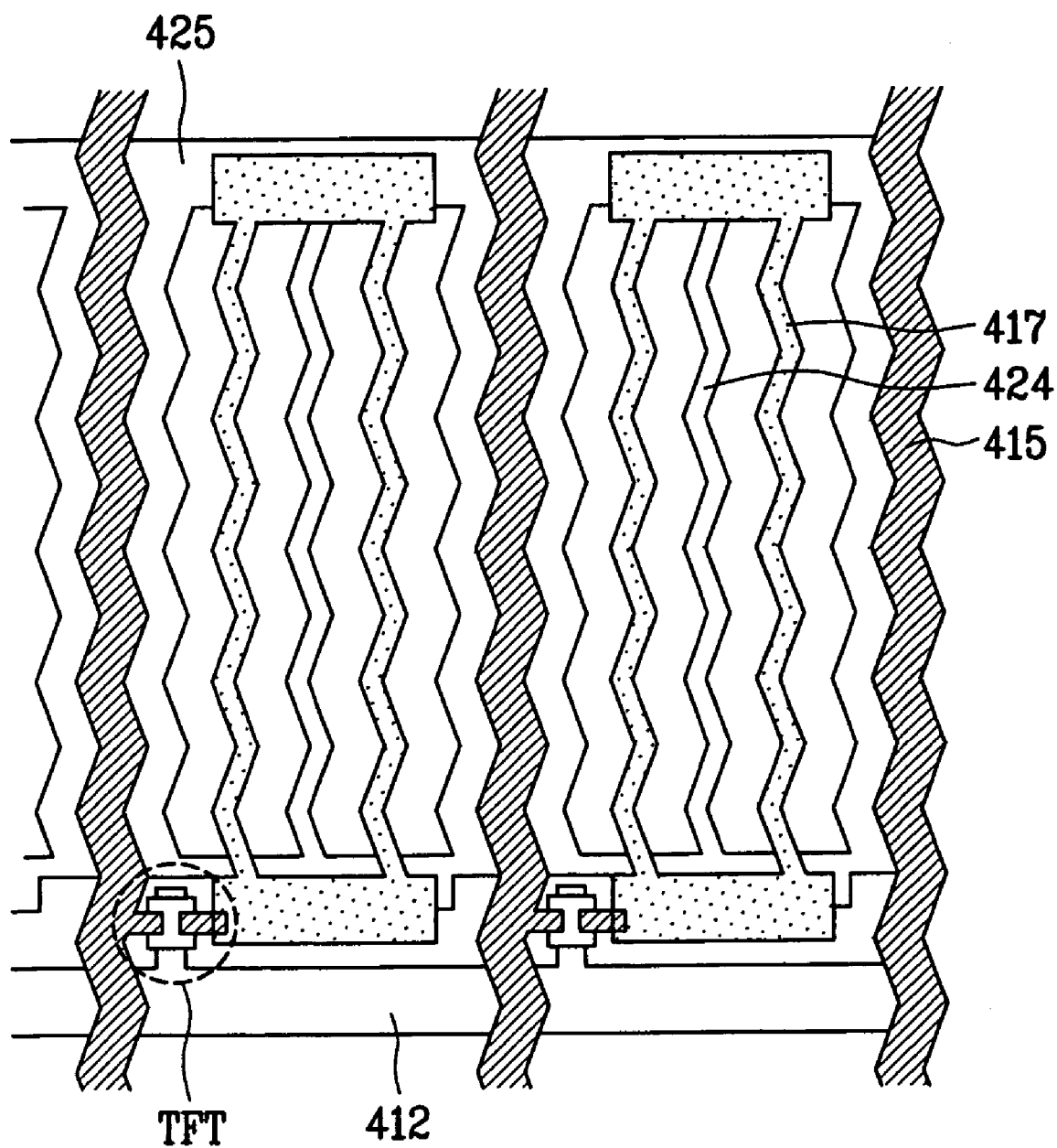
FIG. 8 is a plan view of an IPS mode LCD device according to the second embodiment of the present invention.

As shown in FIG. 8, an IPS mode LCD device according to the second embodiment of the present invention includes a plurality of gate lines 412, a plurality of data lines 415, a thin film transistor TFT, a common line 425, a plurality of common electrodes 424, and a plurality of pixel electrodes 417. The plurality of gate lines 412 are formed in one direction, and the plurality of data lines 415 are formed substantially perpendicular to the gate lines 412 to define pixel regions. The thin film transistor TFT is formed in a predetermined portion of a pixel region defined by the gate and data lines 412 and 415, whereby the thin film transistor TFT switches a voltage. Also, the common line 425 is formed substantially parallel to the gate line 412 to receive a common voltage signal from a source outside an active region. Then, the plurality of common electrodes 424, extending from the common line 425, are formed in a zigzag pattern. The plurality of pixel electrodes 417 are connected to the thin film transistor TFT, and are substantially parallel to the common electrodes 424 in the zigzag pattern.

Figure 9:
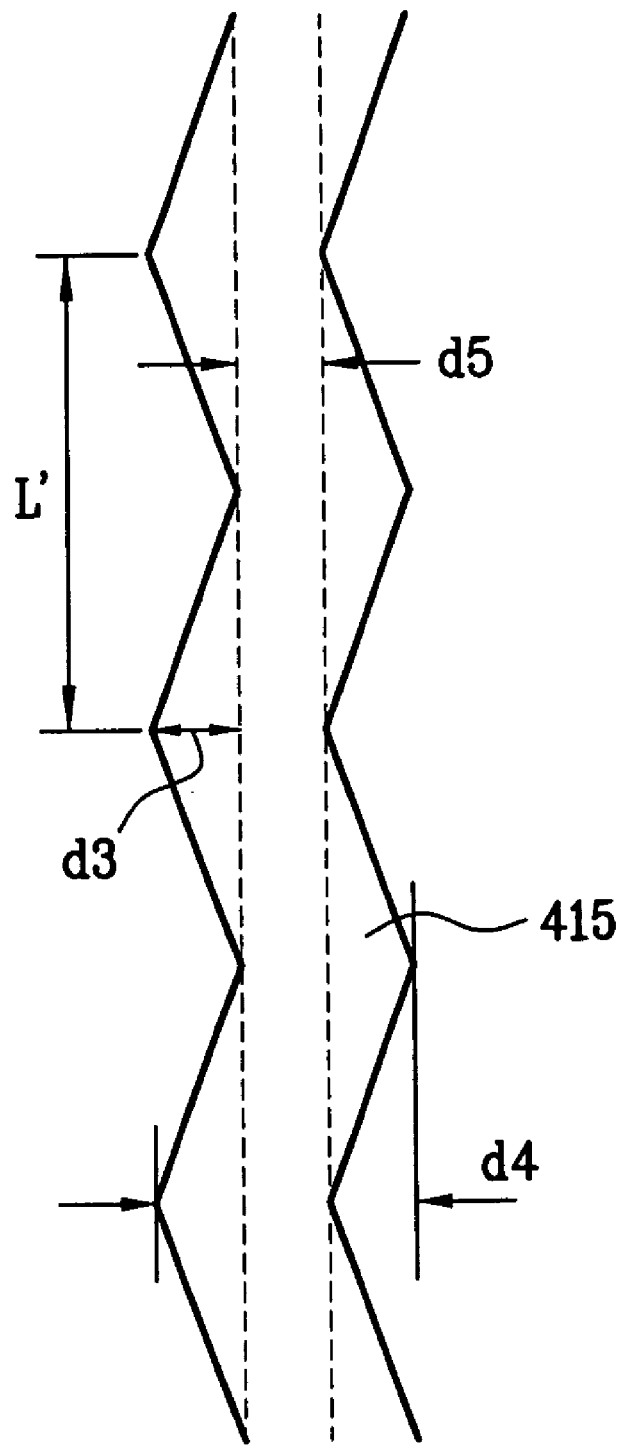
FIG. 9 is an expanded view of a data line of FIG. 8.

As shown in FIG. 9, the data line 415 is comprised of a linear portion having a constant width d5, a plurality of first extending parts formed along a first side of the linear portion, and a plurality of second extending parts formed along a second side of the linear portion. The first and second extending parts may be triangular-shaped. The highest point of the first extending part is formed to correspond with the lowest point of the second extending part, and the lowest point of the first extending part corresponds to the highest point of the second extending part. As a result, the data line 415 is formed in a zigzag pattern, as shown in FIG. 8, whereby the data line is substantially parallel to the common electrodes 424 and the pixel electrodes 417 that are also formed in a zigzag pattern.

In FIG. 9, a resistance value of the data line 415 is proportional to $L'/\{(d4+d5)/2\}$ or $L'/(d3+d5)$. $L'/\{(d4+d5)/2\}$ and $L'/(d3+d5)$ have the same value when $L'$ is a length between the highest points of adjacent extending parts, d3 is a width of the extending part at the highest point, d4 is a width between the highest points of the extending parts of the opposite sides, and d5 is a width of the linear portion.

In comparison, when a straight data line of a mono-domain IPS structure according to the related art presumptively has a length of L' and a width of d', a resistance value is in proportion to $L'/d'$.

Accordingly, d3, d4, and d5 of the data line 415 are set at a suitable range for having the similar resistance values in $L'/\{(d4+d5)/2\}$ or $L'/(d3+d5)$ of the data line 415 according to the present invention and $L'/d'$ of the data line according to the related art. Herein, d5 is set to $\geq 0$ μm. In this case, the data lines of the related art and the present invention may be formed of the same material.

According to the second embodiment of the present invention, it is possible to form a two-domain IPS mode of S-IPS structure without an increase of the resistance in the data line as compared with the related art mono-domain IPS mode.

Hereinafter, an IPS mode LCD device according to a third embodiment of the present invention will be described with reference to the plan view of FIG. 10. In an IPS mode LCD device according to the third embodiment of the present invention, a data line, and a pixel electrode and a common electrode formed in a unit pixel region are bent less than those of the IPS mode LCD device according to the second embodiment of the present invention. Also, an outer common electrode adjacent to the data line in the IPS mode LCD device according to the third embodiment of the present invention is different from the outer common electrode in the IPS mode LCD device according to the second embodiment of the present invention.

Figure 10:
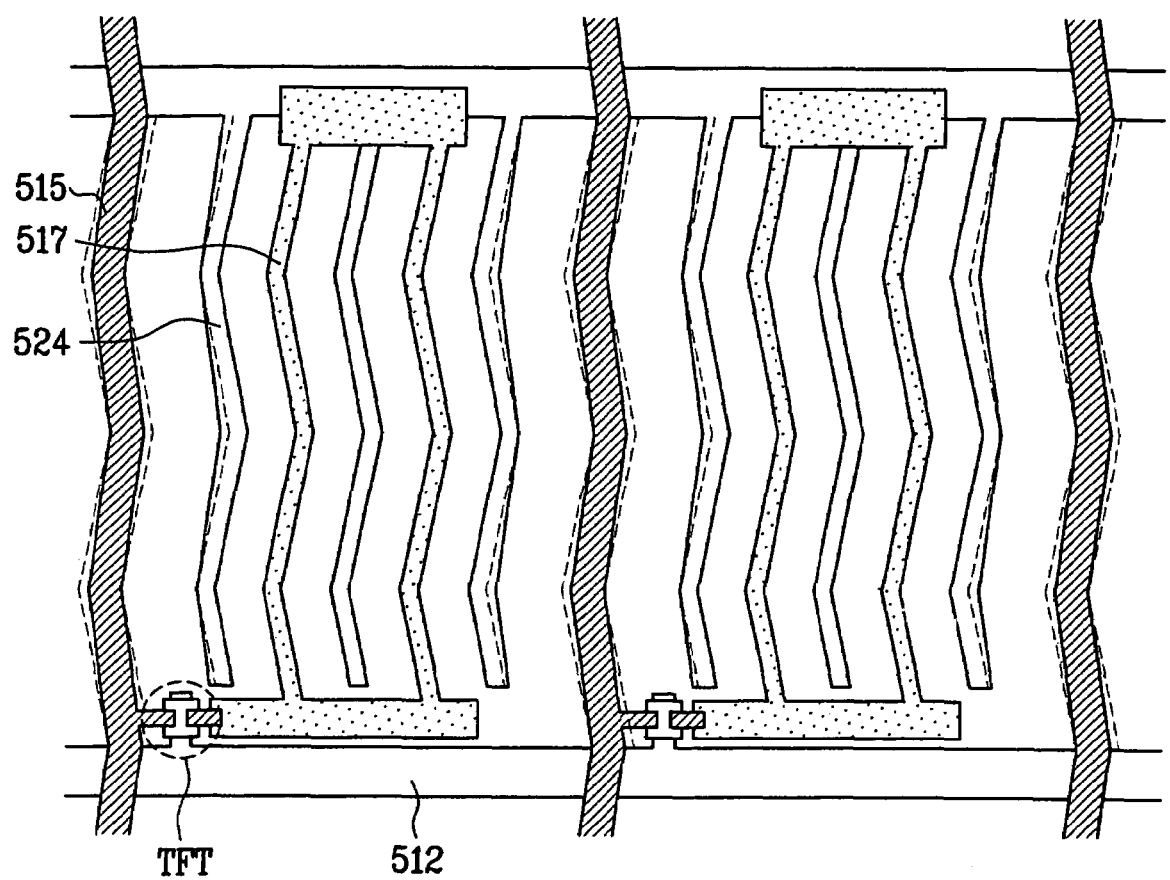
FIG. 10 is a plan view of an IPS mode LCD device according to the third embodiment of the present invention.

As shown in FIG. 10, the pixel electrode 517 and the common electrode 524 of the pixel region are bent less as compared with those shown in FIG. 8. As the bent portions of the pixel electrode and the common electrode decrease, if extending parts of the data line 515 are formed substantially parallel to the pixel electrode 517 and the common electrode 524, the size in each extending part of the data line 515 increases. As the size in each extending part of the data line 515 increases, an aperture ratio is decreased. In this respect, it is required to change the pattern of the common electrode 524 adjacent to the data line 515, thereby preventing the size of the extending part of the data line 515 from being increased.

That is, as shown in FIG. 10, the size of the extending part of the data line 515 decreases, and the size of common electrode 524 adjacent to the data line 515 increases to correspond to the decreased extending part. As a result, one side of the data line is substantially parallel to an adjacent first side of the common electrode 524, and a second side of the common electrode 524 is substantially parallel with the pixel electrode 517 and another common electrode. Thus, the width the common electrode 524 adjacent to the data line 515 is uneven.

In the IPS mode LCD device according to the third embodiment of the present invention, by controlling the width of the common electrode 524 adjacent to the data line 515 in the periphery of the pixel region, the size of the extending part of the data line 515 decreases, thereby preventing an increase of the resistance. Also, the data line 515 is formed substantially parallel to the common electrode. In this state, even though the size of the common electrode increases according to the decrease in size of the extending part of the data line, it is possible to improve the aperture ratio to correspond to the decreased size of the extending part of the data line 515 because the common electrode is formed of the transparent material.

Although not shown, in another embodiment of the present invention, if the pixel electrode and the common electrode are formed along the longitudinal direction with respect to the gate line, the pixel electrode and the common electrode are formed substantially parallel with the gate line. As a result, as the pixel electrode and the common electrode are formed in the zigzag pattern with respect to the gate line, the gate line is comprised of the linear portion, and the plurality of extending parts formed along both sides of the linear portion, as described in the first to third embodiments of the present invention. In this embodiment, the extending parts of the gate line may be formed using the same method as those of the data line in the first and second embodiments of the present invention.

As described above, the IPS mode LCD device according to the present invention and the method for fabricating the same have the following advantages.

First, the data line or the gate line is comprised of the linear portion, and a plurality of extending parts formed at both sides thereof, thereby forming the data or gate line substantially parallel to the pixel electrode and the common electrode without an increase in resistance. Accordingly, it is possible to form the two-domain IPS mode of the S-IPS structure without increasing the resistance of the data line.

Also, even when the common electrode and the pixel electrode have less of a bent structure as compared with those of the related art, it is possible to form the data line substantially parallel to the adjacent common electrode without an increase of the area charged by the extending parts of the data line. Thus, it is possible to form the two-domain IPS mode of the S-IPS structure without an increase of the resistance of the data line, and to improve the aperture ratio.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. An IPS mode LCD device comprising:
    a substrate;
    a plurality of gate lines formed on the substrate;
    a plurality of data lines crossing the gate lines to define pixel regions, each of the data lines having at least one extending part at both sides thereof;
    a common line formed substantially parallel to the gate lines;
    at least one common electrode perpendicularly extending from the common line;
    a thin film transistor formed at a crossing portion of the gate and data lines; and
    at least one pixel electrode connected to a drain electrode of the thin film transistor, and formed substantially parallel to at least one common electrode,
    wherein the data lines are comprised of a linear portion having a constant width, a plurality of first extending parts formed along a first side of the linear portion, and a plurality of second extending parts formed along a second side of the linear portion,
    wherein a highest point of one of the first extending parts corresponds to a highest point of one of the second extending parts with respect to the linear portion, and a lowest point of one of the first extending parts corresponds to a lowest point of one of the second extending parts with respect to the linear portion,
    wherein the first and second extending parts are substantially symmetric with respect to a longitudinal portion direction of the linear portion.

2. The IPS mode LCD device of claim 1, wherein the common line and at least one common electrode are formed on a same layer as the gate line.

3. The IPS mode LCD device of claim 1, wherein the common line and the common electrode are formed on a same layer as the pixel electrode.

4. The IPS mode LCD device of claim 1, wherein the common electrode and the pixel electrode are substantially parallel to the data lines.

5. The IPS mode LCD device of claim 1, wherein the common electrode and the pixel electrode are formed in a zigzag pattern.

6. A method for fabricating an IPS mode LCD device comprising:
    forming a plurality of gate lines on a substrate;
    forming a common line substantially parallel to the gate lines, wherein at least one common electrode is formed to perpendicularly extend from the common line;
    forming a plurality of data lines crossing the gate lines to define pixel regions, each data line having at least one extending part at both sides thereof;
    forming a thin film transistor at a crossing portion of the gate and data lines; and
    forming at least one pixel electrode connected to a drain electrode of the thin film transistor and substantially parallel to at least one common electrode,
    wherein the data lines are comprised of a linear portion, a plurality of first extending parts formed alone a first side of the linear portion, and a plurality of second extending parts formed along a second side of the linear portion,
    wherein a highest point of one of the first extending parts corresponds to a highest point of one of the second extending parts with respect to the linear portion, and a lowest point of one of the first extending parts corresponds to a lowest point of one of the second extending parts with respect to the linear portion,
    wherein the first and second extending parts are substantially symmetric with respect to a longitudinal direction of the linear portion.

7. The method of claim 6, wherein the common line and at least one common electrode are formed on a same layer as the gate lines, or on a same layer as the pixel electrode.

8. The method of claim 6, wherein the common electrode and the pixel electrode are formed substantially parallel to the data lines.

9. The method of claim 6, wherein the common electrode and the pixel electrode are formed in a zigzag pattern.

* * * * *